(12) United States Patent
Bordogna et al.

(10) Patent No.: US 11,693,448 B2
(45) Date of Patent: Jul. 4, 2023

(54) TIMESTAMP ALIGNMENT ACROSS MULTIPLE COMPUTING NODES

(71) Applicant: Intel Corporation, Santa Clara, CA (US)

(72) Inventors: Mark Bordogna, Andover, MA (US); Jonathan A. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 16/726,684

(22) Filed: Dec. 24, 2019

(65) Prior Publication Data

US 2020/0133330 A1 Apr. 30, 2020

Related U.S. Application Data

(60) Provisional application No. 62/814,203, filed on Mar. 5, 2019.

(51) Int. Cl.
| | |
|---|---|
| *G06F 1/14* | (2006.01) |
| *H04L 43/106* | (2022.01) |
| *G06F 9/54* | (2006.01) |
| *G06F 1/12* | (2006.01) |

(52) U.S. Cl.
CPC .............. *G06F 1/14* (2013.01); *G06F 1/12* (2013.01); *G06F 9/542* (2013.01); *H04L 43/106* (2013.01)

(58) Field of Classification Search
CPC ... G06F 1/14; G06F 1/12; G06F 9/542; H04L 43/106
USPC .......................................................... 713/500
See application file for complete search history.

(56) References Cited

U.S. PATENT DOCUMENTS

| | | | | | |
|---|---|---|---|---|---|
| 5,535,193 | A  | * | 7/1996 | Zhang ..................... | H04L 43/18 375/228 |
| 5,579,513 | A  | * | 11/1996 | Strohmer .................. | G06F 1/14 713/600 |
| 6,556,832 | B1 | * | 4/2003 | Soliman ................ | H04W 4/029 342/357.31 |
| 7,590,151 | B2 | * | 9/2009 | Middleton ............ | H04J 3/0664 370/512 |
| 7,903,694 | B2 | * | 3/2011 | Defrance ........... | H04N 21/4305 370/503 |
| 9,003,220 | B2 | * | 4/2015 | Chandhoke ............... | G06F 1/14 713/400 |
| 9,058,135 | B1 | * | 6/2015 | Schumacher ............. | G06F 1/10 |

(Continued)

OTHER PUBLICATIONS

Garner, Geoffrey M., "IEEE 1588 Version 2", ISPCS Ann Arbor '08, Sep. 24, 2008, 89 pages.

(Continued)

*Primary Examiner* — Paul R. Myers
(74) *Attorney, Agent, or Firm* — Compass IP Law PC

(57) ABSTRACT

Examples described herein relate to multiple processor nodes which are physically separate with interfaces to a common network interface. A local processor can run a timing recovery algorithm, and tune the master timer to align with the network domain to cause the master timer and network timing domains to be in the same domain. A common master timer can be used to align time stamps of independent processor nodes. A processor node can use the common master timer as a reference and the processor does not need to communicate with another processor to synchronize its timer.

25 Claims, 12 Drawing Sheets

(56) References Cited

U.S. PATENT DOCUMENTS

| | | | | |
|---|---|---|---|---|
| 2001/0055311 A1* | 12/2001 | Trachewsky | ......... | H04L 1/0003 370/445 |
| 2003/0117899 A1* | 6/2003 | Eidson | ................. | H04J 3/0664 368/46 |
| 2003/0177154 A1* | 9/2003 | Vrancic | .................... | G06F 1/12 708/160 |
| 2004/0049706 A1* | 3/2004 | Strong | ..................... | G06F 1/14 713/400 |
| 2004/0062278 A1* | 4/2004 | Hadzic | ................. | H04J 3/0688 370/503 |
| 2005/0228902 A1* | 10/2005 | Lienhart | ................... | G06F 1/12 709/248 |
| 2007/0038999 A1* | 2/2007 | Millington | ......... | H04L 65/4076 718/100 |
| 2007/0266119 A1* | 11/2007 | Ohly | .................... | H04J 3/0664 709/208 |
| 2008/0270800 A1* | 10/2008 | Krober | ................. | H04J 3/1688 713/178 |
| 2010/0103781 A1* | 4/2010 | Rai | .......................... | G06F 1/12 368/55 |
| 2010/0118895 A1* | 5/2010 | Radulescu | .............. | G04G 7/00 370/503 |
| 2010/0158183 A1* | 6/2010 | Hadzic | ................... | H03L 7/087 375/376 |
| 2010/0177763 A1* | 7/2010 | Van Der Stok | ...... | H04J 3/0638 370/350 |
| 2011/0276994 A1* | 11/2011 | Higgins | .............. | H04N 21/436 725/39 |
| 2012/0030495 A1* | 2/2012 | Chandhoke | .............. | G06F 1/12 713/400 |
| 2013/0125118 A1* | 5/2013 | Niesser | .............. | G06F 11/1604 718/1 |
| 2013/0301635 A1* | 11/2013 | Hollabaugh | ..... | H04W 56/0035 370/350 |
| 2013/0318390 A1* | 11/2013 | Takehara | ........... | G06F 13/4072 713/375 |
| 2014/0143582 A1* | 5/2014 | Kindred | ............. | H04W 56/005 713/400 |
| 2014/0313289 A1* | 10/2014 | Kim | ................... | H04N 21/2362 348/43 |
| 2014/0355628 A1* | 12/2014 | Akhlaq | ............... | H04W 56/001 370/509 |
| 2015/0163049 A1* | 6/2015 | Nors | ..................... | H04J 3/0664 398/98 |
| 2015/0277989 A1* | 10/2015 | Laborde | ................... | G06F 9/52 718/107 |
| 2016/0170439 A1* | 6/2016 | Aweya | .................... | H04L 69/28 713/401 |
| 2016/0170440 A1* | 6/2016 | Aweya | .................... | G06F 1/10 713/503 |
| 2017/0237512 A1* | 8/2017 | Galea | .................... | H04J 3/0644 370/350 |
| 2017/0315582 A1* | 11/2017 | Zhang | ....................... | G06F 1/10 |
| 2017/0330278 A1* | 11/2017 | Radulescu | ........... | H04J 3/0667 |
| 2018/0227080 A1* | 8/2018 | Stein | ................ | H04N 21/4305 |
| 2019/0045475 A1* | 2/2019 | Kasichainula | .... | H04W 56/0015 |
| 2019/0208381 A1* | 7/2019 | Booij | ..................... | G01S 1/725 |
| 2019/0332137 A1* | 10/2019 | Benjamini | ................ | G06F 1/12 |
| 2020/0033906 A1* | 1/2020 | Maddukuri | ............... | G06F 1/24 |

OTHER PUBLICATIONS

Intel, "Intel 64 and IA-32 Architectures Software Developer's Manual, Combined vols. 1, 2A, 2B, 2C, 2D, 3A, 3B, 3C, 3D and 4, Section 17.17 Time-Stamp Counter", vol. 3B-17-41, May 2020, pp. 3431-3433, 3 pages.

Solomon, Richard, "Express Yourself—Spring Ahead", SYNOPSYS, https://blogs.synopsys.com/expressyourself/2014/03/09/spring-ahead/, posted Mar. 9, 2014, 4 pages.

* cited by examiner

TIMESTAMP ALIGNMENT ACROSS MULTIPLE COMPUTING NODES

RELATED APPLICATION

The present application claims the benefit of a priority date of U.S. provisional patent application Ser. No. 62/814,203, filed Mar. 5, 2019, the entire disclosure of which is incorporated herein by reference.

DESCRIPTION

It is important to align time stamp counters (TSCs) across central processing unit (CPU) nodes (or hosts) to a common network reference. This is needed in any distributed application that relies upon network or global time. For example, in 4G/5G applications, the radio frames that are sent to the antenna must occur every 10 ms with small jitter and be based on its view of network time. This allows all base stations to be synchronized and meet the timing standard at the antenna, which can be +/−1.25 microsecond time alignment.

For a description of the TSC within Intel Architecture CPU cores, see volume 3, section 17.17 of Intel® 64 and IA-32 Architectures Software Developer's Manual (2019), which is incorporated herein by reference in its entirety.

DETAILED DESCRIPTION

A TSC is clocked from the CPU's crystal clock oscillator, which is free running and asynchronous to any network timing domain. The network timing domain typically runs off a highly stable network clock source usually traceable to a stratum 1 accurate clock. These two domains (TSC and network reference) are asynchronous and a challenge is to synchronize or understand the alignment/relationship between the two domains. This will allow CPU applications to process radio frame information at the right time instants (or in general, allow distributed applications to be within a certain TSC error). Network time is obtained through timing recovery protocol, such as IEEE 1588.

Figure 1:
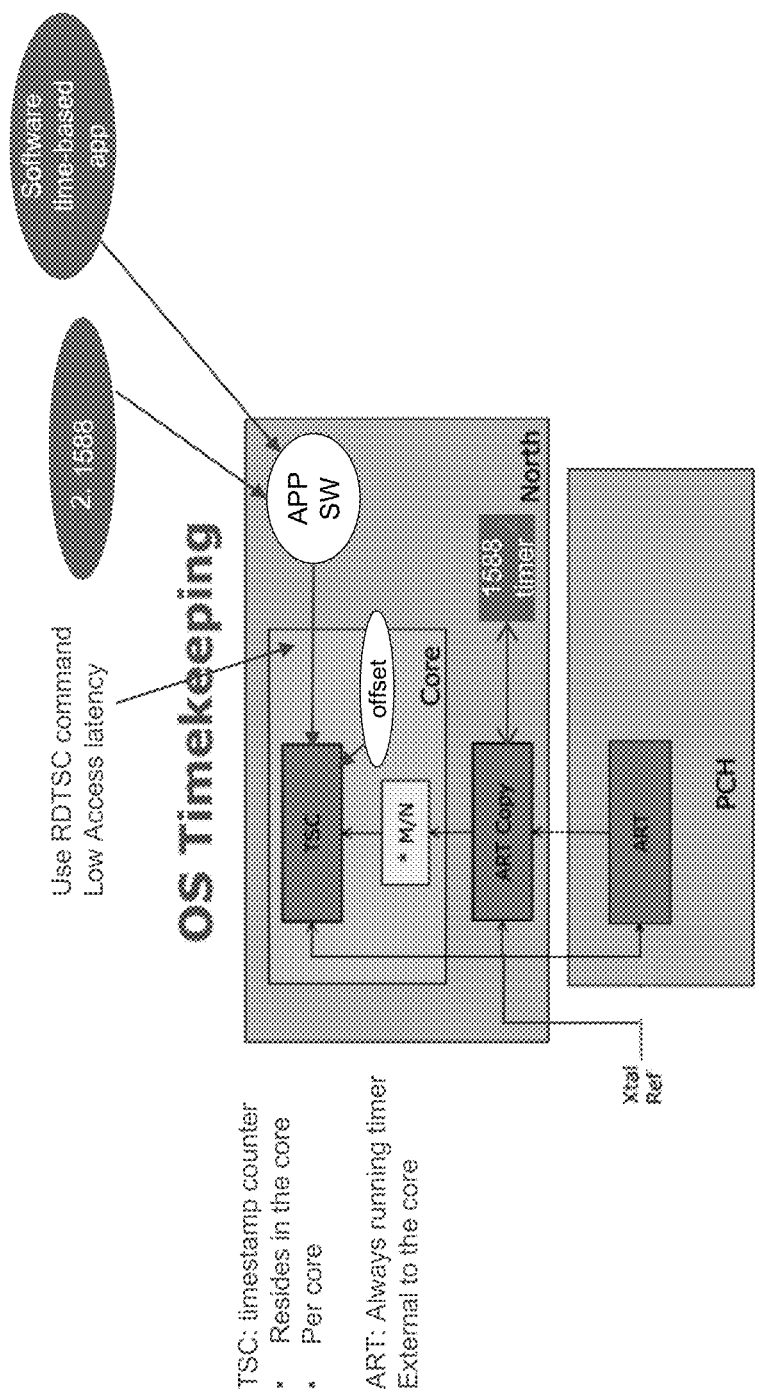
FIG. 1 shows a SoC example with a single CPU node integrated with Ethernet ports supporting an IEEE 1588 timing recovery.

In one example, the CPU and the network timing domain (such as IEEE 1588) can be integrated into a system on chip (SoC). FIG. 1 shows a SoC example with a single CPU node integrated with Ethernet ports supporting an IEEE 1588 timing recovery. A solution is to take a free running TSC, which is based on the CPU's crystal clock source, and align this TSC domain to a network reference domain (IEEE 1588). Incoming/outgoing timing packets are timestamped with the master timer and the CPU will eventually tune the master timer to the IEEE 1588 network source. Then, using a strobing system (e.g., the Intel On-chip System Fabric SideBand (IOSF-SB) Global Time Sync Protocol), the CPU can obtain the relationship between the Always Running Timer (ART) and the master timer/1588 source. The CPU can derive an mX+b (e.g., linear) relationship between the ART and the master timer.

Figure 2:
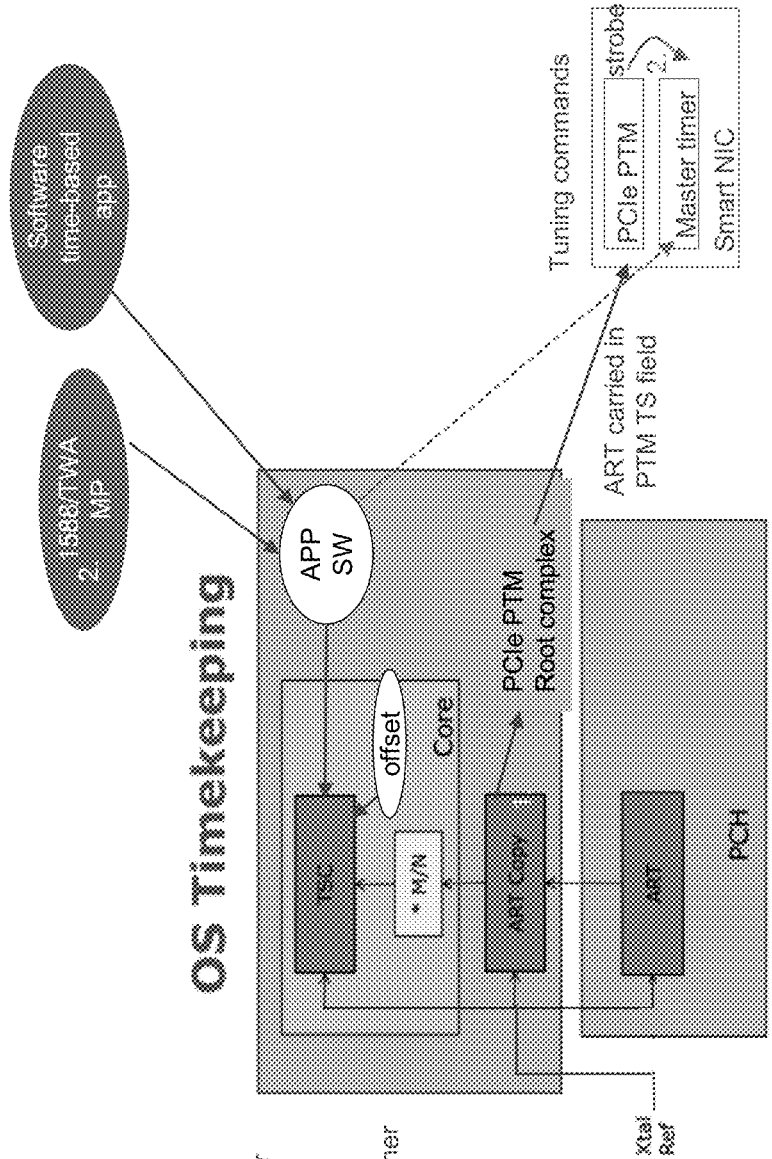
FIG. 2 depicts a configuration where a single CPU node and a network interface controller (NIC) connected via a link.

FIG. 2 depicts a configuration where a single CPU node and a network interface controller (NIC) are connected via a link (e.g., PCIe). The NIC card has a copy of the TSC. The TSC value is transferred over the link via a precision time measurement (PTM) protocol to the CPU.

For multiple CPU nodes that interface with a common NIC, CPU nodes have independent ART/TSC domains. Timestamp Counters (TSC) within a CPU node are free running based on a local crystal. Therefore, the TSCs alignment across multiple CPU nodes will stray over time, since all local crystals are independent and asynchronous to each other. Any distributed application that uses the TSC must be very careful to avoid issues, such as non-monotonic time results and jitter associated with time results. Free running TSCs of CPU nodes may not be aligned across multiple CPUs.

Various embodiments provide for CPU node(s) connected to a common NIC. CPU node(s) are remote from the 1588 Precision Time Protocol (PTP) timing domain and connected to a common NIC. Various embodiments provide a common master timer in a smart NIC or NIC and the common master timer can be calibrated using the network domain. Various embodiments provide for a common master timer in the NIC to be synchronized to various network sources. Examples of network sources include time reference based on IEEE 1588 via any Ethernet port (of the NIC), GPS, synchronous Ethernet from any port (of the NIC), and other schemes. Various embodiments allow the NIC master timer to be aligned to a network reference or the master timer to free run. A master timer can be used to calibrate a clock of any CPU node that has direct connection with the NIC and/or another CPU node with a direct connection to the NIC. Various embodiments provide for aligning TSCs of various CPU nodes via a single common master timer reference.

Some integer number N CPU nodes can be connected to the smart NIC or NIC via PCIe. Various embodiments support various configurations including CPU nodes which are physically separate with PCIe interfaces to a common smart NIC. A local processor can run a timing recovery algorithm, such as IEEE 1588, and tune the master timer to align with the network domain to cause the master timer and network timing domains to be in the same domain. A common master timer will be used to align TSCs of independent CPU nodes. Each CPU node uses the common master timer as a reference and a CPU does not need to communicate with another CPU to synchronize its timer.

Accordingly, distribution of time-oriented applications across CPU nodes can be achieved with time stamp synchronization. An example application is in 4G/5G applications, where radio frames that are sent to the antenna must occur every 10 ms with less than 1.25 usec jitter. Another example is financial trading where the CPUs run an application whose reference time must be aligned with a network time. Aligning the TSCs, based on various embodiments, can allow a distributed approach to radio frame generation across multiple CPU nodes. Other distributed applications requiring accurate view of time can be distributed across multiple CPU nodes.

Another application space for synchronized TSC across multiple CPU nodes is distributed applications in cloud computing that rely on a network or global time. Depending on the processing, the inaccuracy or skew between the TSCs in each host must be minimized. One possible requirement in this application is to make sure that a CPU in node 1, when reading its TSC, has a time value always greater than a received time value from another CPU node.

Another example use of various embodiments of time stamp synchronization is in a centralized node in a Radio Access Network (RAN) where there is one timing reference for all RAN applications. Yet another example is with for virtual machines or containers where TSC aligned to a common time base is important. Servers can use a master timer of a network interface to synchronize time stamps with other servers.

Depending on the processing, the inaccuracy or skew between the TSCs in each host is to be reduced or minimized by calibration with a master timer in a NIC. In some examples, alignment between TSCs across multiple CPU nodes and network time can be in the range of 100 ns or better.

Figure 3:
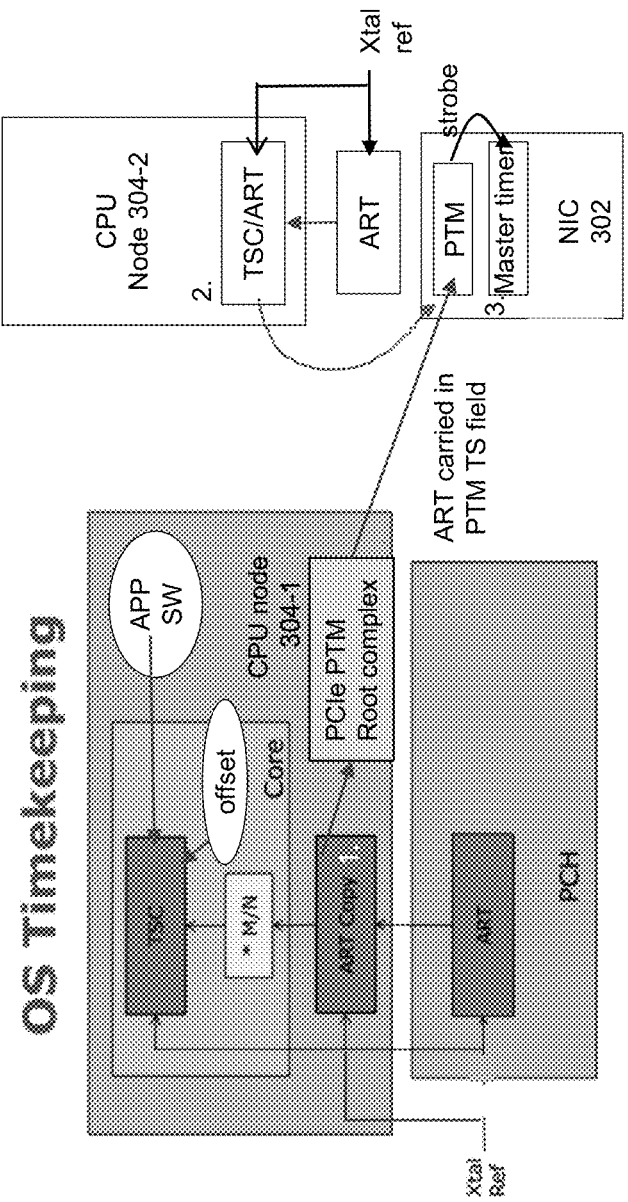
FIG. 3 depicts an example whereby multiple CPU nodes can interface with a common NIC.

FIG. 3 depicts an example whereby multiple CPU nodes can interface with a common NIC. In this case, CPU nodes 304-1 and 304-2 have ART/TSC domains that are independent from one another. This example does not require communication between CPU nodes 304-1 and 304-2 for time stamp synchronization, because a CPU node performs timing synchronization with the NIC. In other words, the CPU nodes 304-1 and 304-2 are independent with respect to timing/clock synchronization. In this example, there are 3 timing domains (e.g., NIC 302 master timer/network timing domain, TSC/ART of CPU 304-1, and TSC/ART of CPU 304-2), but any number of CPUs can be used to align time stamps with the master timer. Of course, the instant solution is operable in an environment where timing is also shared between the CPUs in at least one embodiment.

In this example, CPU node 304-1 uses a timestamp counter (TSC) that is part of a core. A chipset (e.g., platform controller hub (PCH)) uses an ART that is external to a core. A software (SW) driver executing on CPU node 304-1 can trigger sending (at 1) an ART for CPU node 304-1 to NIC 302. NIC 302 includes a master timer. The master timer can be a counter that increments based on clock cycles or a clock signal. The master timer can be tuned to GPS or IEEE 1588 timing in various embodiments. The PTM used by NIC 302 can take a simultaneous strobe of a value of master timer and the ART received from CPU node 304-1. NIC 302 can store pairs of value of master timer and the ART received from CPU node 304-1 and provide the pairs to CPU node 304-1. CPU node 304-1 can calculate an adjustment to its TSC value based on multiple pairs of value of master timer and the ART received from CPU node 304-1. Similarly, CPU node 304-2 can perform a similar operation to determine an adjustment to its TSC value based on multiple pairs of value of master timer and the ART received from CPU node 304-2.

CPU nodes 304-1 and 304-2 can be coupled to NIC 302 using any type of connection. Any type of connections can be used such as one or more of: an interconnect, network, bus, or fabric. A connection can be provide communications compatible or compliant with one or more of: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof.

CPU nodes 304-1 and 304-2 can execute applications and a virtualized execution environment. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

In some examples, CPU node 304-1 and 304-2 can include any central processing unit (CPU), core, graphics processing unit (GPU), field programmable gate array (FPGA), or application specific integrated circuit (ASIC).

Any CPU node can execute software that performs Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run as virtual machines (VMs) or in virtual execution environments. VNFs can be linked together as a service chain. In some examples, EPC is a 3GPP-specified core architectures at least for Long Term Evolution (LTE) access. 5G network slicing can provide for multiplexing of virtualized and independent logical networks on the same physical network infrastructure.

Figure 4:
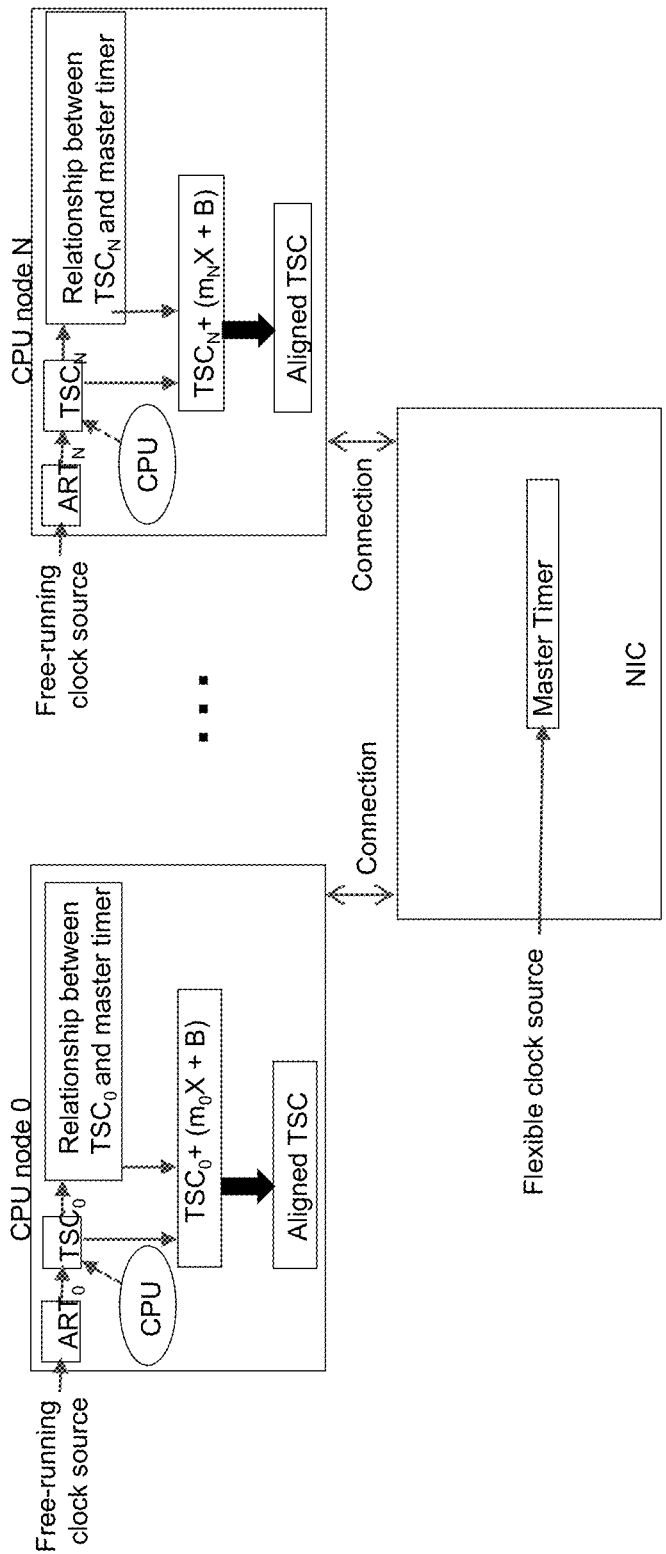
FIG. 4 provides an example of time stamp synchronization using a common reference in a NIC.

FIG. 4 provides an example of a common reference (master timer) in a NIC which is attached to N CPU nodes, where N is an integer equal or greater than 2. TSCs across N CPU nodes use this common master timer from the NIC as a reference point. A NIC with access to a clock source generates a master timer. The clock source can be based on a clock signal derived from packets received at an Ethernet port, global positioning system (GPS) based on a satellites (e.g., space, air, above-ground level, ground-level, or underground), synchronous Ethernet from any port, and other schemes. Various embodiments allow the NIC master timer to be aligned to a network reference or the master timer to free run. CPU nodes 0 to N receive the master timer via a connection from the NIC.

A CPU node 0 receives an $ART_0$ based on a free running clock source to generate a $TSC_0$. Similarly, CPU node N receives an $ART_N$ based on a free running clock source to generate a $TSC_N$. The free running clock source used by CPU node 0 and CPU N can be the same or different and independent in that CPU node 0 to CPU node N can use different free running clock sources. CPU node 0 determines a relationship between $TSC_0$ and the master timer. CPU node 0 can generate linear or other relationship between $TSC_0$ and the master timer and determine an aligned TSC for CPU node 0 based on the relationship. For example, a linear relationship between $TSC_0$ and the master timer can be $m_0X+B$. Similarly, CPU node N can determine a relationship between $TSC_N$ and the master timer. For example, a linear relationship between $TSC_0$ and the master timer can be $m_NX+B$. CPU node 0 adjusts its $TSC_0$ based on the determined relationship and provides an aligned TSC value for use. Similarly, CPU node N adjusts its $TSC_N$ based on the determined relationship and provides an aligned TSC value for use. The aligned TSC value from CPU node 0 and node N can be the same value.

Reads of TSC by CPUs can be used for time oriented processing at least by applications and uses described herein.

Figure 5:
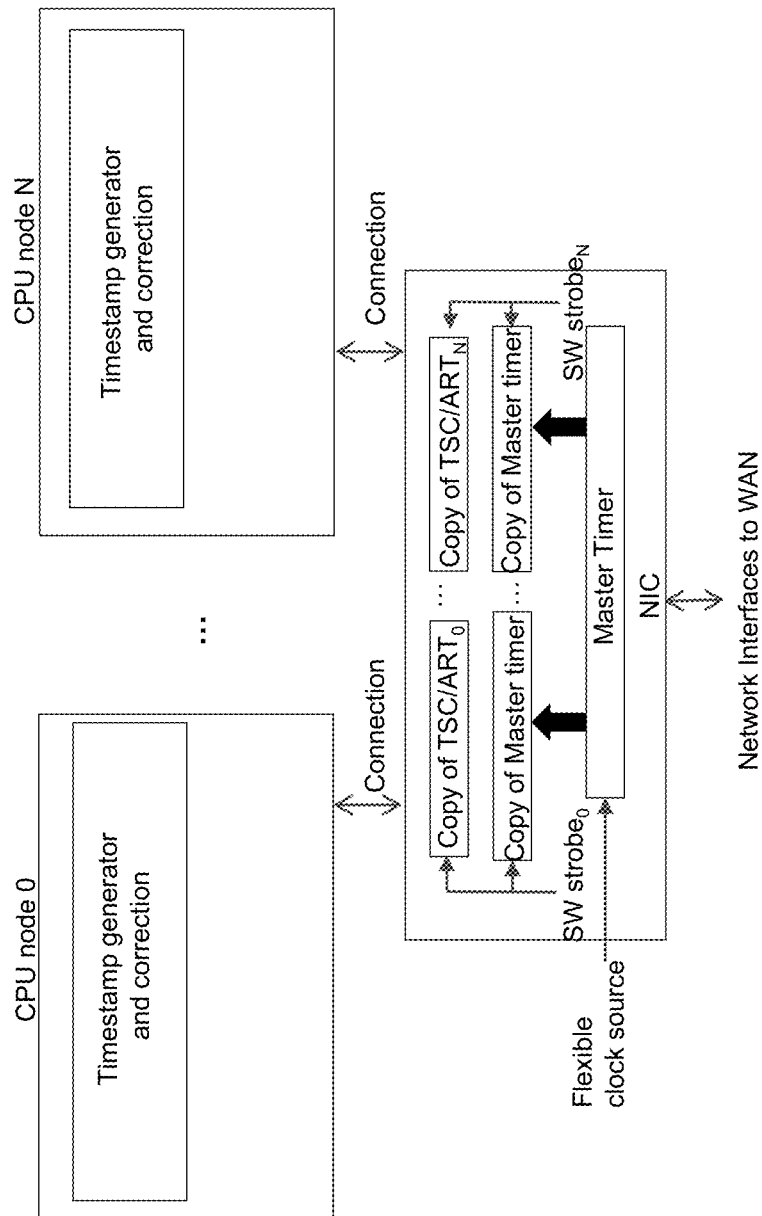
FIG. 5 provides an example of a master timer in a NIC which is attached to N CPU nodes.

FIG. 5 depicts an overview of a system where CPU nodes determine a relationship between timing domains of a master timer and a CPU. At a time interval or at the initiation of a driver, CPU node 0 provides its $TSC/ART_0$ to the NIC. At a time interval or at the initiation of a driver, CPU node N provides its $TSC/ART_N$ to the NIC. The NIC uses its master timer to capture an instant that the TSC/ART is received and stores the master timer and TSC/ART as a pair. The pair can be stored in Memory-mapped I/O (MMIO). Then, periodically, or at the initiation of a driver, CPU node 0 and CPU node N periodically generate a strobe to the NIC to simultaneously capture the TSC/ART and master timer for the CPU. Capturing of this data and recapturing of this data allows a CPU to generate a relationship between the TSC/ART and the master timer of the NIC according to one or more of the above said capturing, storing and/or strobing. All or a subset of N CPU nodes independently track this NIC common master timer via a relationship. For CPU 0, a linear relationship, $m_0X+b_0$, between its own $TSC/ART_0$ and the common master timer. The common master timer can be provided using PCIe Precision Time Measurement (PTM) or other techniques and cross reference timestamp APIs. A nonlinear relationship can be used, in some examples, where for example a parabolic or higher order relationship is determined between $TSC/ART_A$ and the common master timer, where A is any number between 0 and N.

For example, based on multiple pairs of values of the TSC/ART0 and the common master timer, a CPU node 0 can derive a relationship between TSC0 and master timer. CPU node 0 can generate a strobe to the NIC via timestamp API, read captured TSC/ART0 and master timer from the NIC, and derive a linear relationship between TSC0 and master timer. Similarly, CPU node N can derive a relationship between TSCN and master timer. CPU node N can generate a strobe to the NIC via timestamp API, read captured TSC/ARTN and master timer from the NIC, and derive a linear relationship between TSCN and the master timer. The relationship can be recalculated periodically or as often as after every receipt of a new pair of TSC/ART and master timer from the NIC. Various embodiments can include one or more the above operations in any combination thereof.

Figure 6:
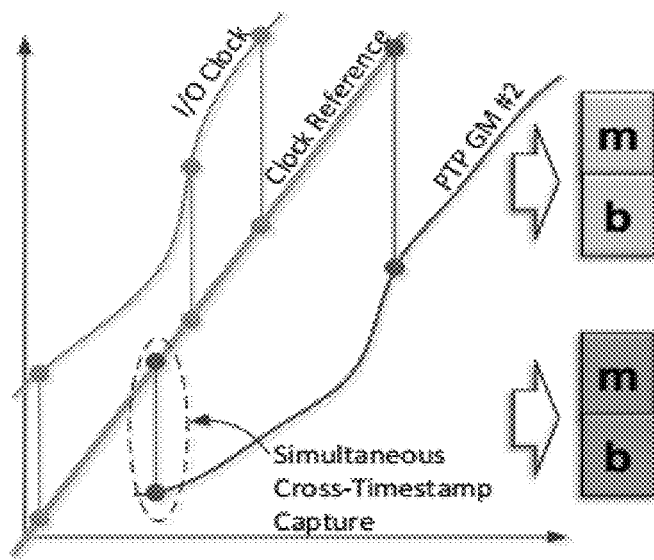
FIG. 6 depicts an example of a linear relationship offset.

FIG. 6 depicts an example of a linear relationship, mX+b, between multiple pairs of a CPU's TSC/ART and the common master timer as captured by the NIC. A CPU 0 can use a determined linear relationship to adjust its time stamp. A CPU N can use a determined linear relationship to adjust its time stamp. The linear relationship can be different for each CPU. But by use of the relationship to adjust a time stamp, time stamps among CPUs are more closely calibrated according to this embodiment.

Figure 7:
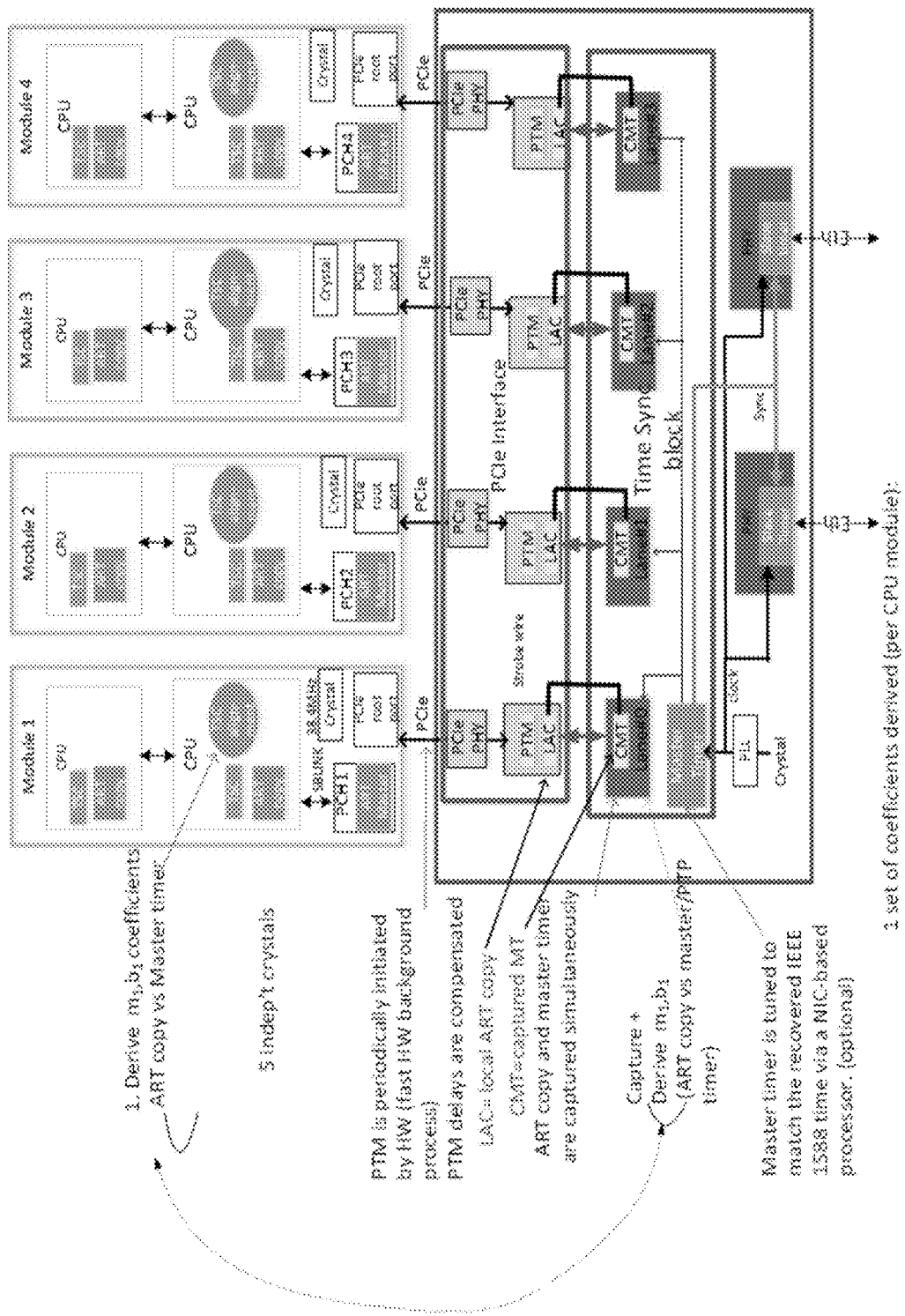
FIG. 7 depicts an example system.

FIG. 7 depicts an example system. A NIC's time reference is based on the master time counter which is clocked via an external source (e.g., 25 MHz crystal) or a time_ref based input. A CPU core's time is based on the Always Running Timer (ART) and the Time Stamp Counter (TSC) based on a separate, independent crystal oscillator. Various embodiments provide for relating the NIC and CPU time units. A NIC supports multiple CPU modules via a host interface. A Host CPU module and any local processor has its own ART and TSC, so each of these host CPU modules will need to determine the offset of its ART/TSC versus the timer of the NIC based on the master time counter.

In this example, a NIC is connected to four host cores using PCIe PTM, but other numbers of cores can be connected. PCIe PTM is used to transfer the ART copy from each CPU host core to the NIC. An ART copy is created in the PCIe interface, and in some examples, a PTM circuit. A hardware process continuously triggers this PTM PCIe flow. However, there can be software involvement in the transfer of an ART copy from a host CPU module to the NIC. A software background process can periodically issue a strobe to cause a read of a local ART copy from a CPU (LAC) and master timer and develop a relationship between the LAC and the master timer.

Time distribution within a NIC can further include determination of offsets by each of the four logical interfaces within the time sync block and the corresponding PCIe interface block supports. This allows the comparison of the ART copy from CPU nodes obtained via PTM and the master timer. In some examples, the application software triggers the cross-reference timestamping. The rate at which the application software triggers this command is dependent on the application requirements including the drift rates of the ART master in the host CPU/PCH and the master timer in the NIC. The PCIe interface block which has the requester, Trequester function (which contains the local ART copy (LAC)), interfaces to the responder, the Tresponder function (which contains the captured Master Timer), in the power management unit (PMU) block. This allows a simultaneous capture of the ART copy and the master timer. Note that there can be a delay between capture of the ART and receipt and storage at the NIC. In such cases, an offset can be determined and added to the ART to account for time taken to transfer the captured ART and storage of the captured ART in the NIC.

Each of the four host processors will use the strobed values to derive a set of coefficients that will allow tracking of its corresponding ART/TSC versus the master timer found in the time sync block. One set of coefficients will be computed by processor-executed software for this relationship (e.g., master time counter versus CPU ART/TSC). After the computation of a set of coefficients, the TSC among all four CPU modules could be more closely aligned to one another as opposed to when CPU modules are synchronized to each other.

A NIC can support accurate physical layer (PHY)-based timestamping mechanism for network time distribution protocols, such as IEEE 1588. Network time distribution can occur via IEEE 1588 and other protocols. This requester time counter to PHY responder counter distribution supports time errors <X ns. The CPU cores or a processor in the smart NIC will run the IEEE 1588 (or other) protocol. A processor will be able to determine the 1588 PTP time to master time counter offset via the captured Ethernet ingress/egress timestamps in the NIC plus the captured PTP packets. The local processor used by the NIC will adjust the master timer to align this with IEEE 1588 time.

Figure 8:
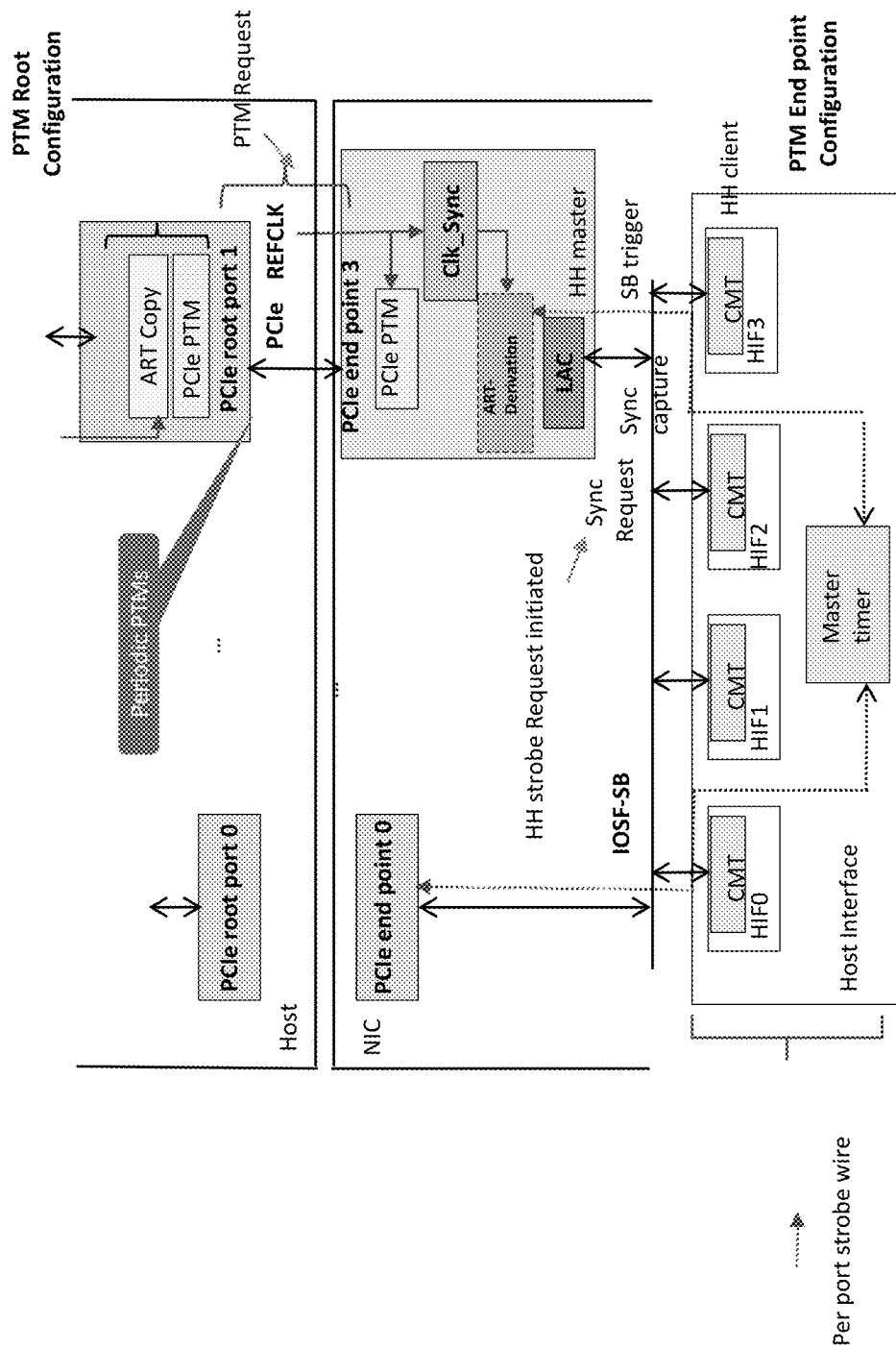
FIG. 8 depicts another visualization of capturing local ART copy from a CPU and a master timer.

FIG. 8 depicts another visualization of capturing local ART copy from a CPU and a master timer. This example shows capture of the captured master timer (CMT) in synchronization with a captured ART copy from a CPU core.

Figure 9:
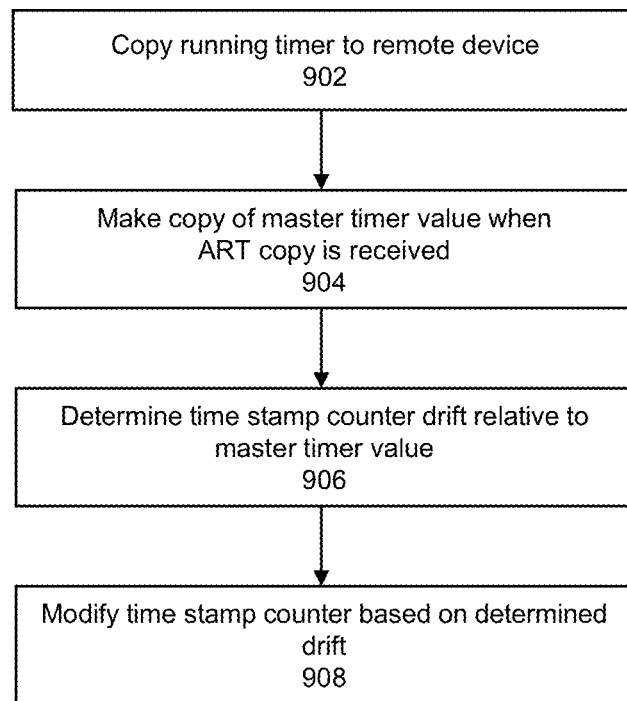
FIG. 9 depicts an example process.

FIG. 9 depicts an example process. The process can be performed for any core that uses a remote device's master timer to determine a time stamp counter drift. At 902, a copy of the always running timer (ART) is sent to a remote device. The remote device can be a register in a PTM time responder of a network interface or some other device (e.g., field programmable gate array (FPGA), ASIC, and so forth). Precision time measurement (PTM) is periodically initiated by hardware and/or software and can be an autonomous background task. PTM can cause copy of an ART copy to register local ART copy (LAC). A TSC can be a multiple of the ART copy. PCIe PTM is used to transfer the ART copy to a NIC, smart NIC or other device. An ART copy (LAC) can be created in the PCIe interface block of the network interface.

At 904, a copy of the master timer value is made when the ART copy is stored in the remote device. For example, a simultaneous strobe is generated and sent to both the master timer and the LAC for simultaneous capture of both the master timer and the LAC. The strobe initiates a capture of the master timer and the captured master timer is stored in a buffer for the captured master timer (CMT). The strobe also causes capture of the ART copy in the PTM block. In some examples, a hardware device or software application (e.g., ART copy to master timer alignment) running on CPU controls when comparison between ART copy and master timer occurs and generates this strobe.

At 906, a determination of time stamp counter drift relative to master timer value is determined. For example, a software executing on a core can compute Mx+B relationship for its time counter relative to the master timer value. The software accesses the simultaneously captured ART copy (LAC) and master timer from the NIC. Software determines drift between ART copy and master timer value based on multiple ART copy and Master Timer values to determine Mx+B relationship. The frequency of relationship determination can be higher when determining an Mx+B relationship.

At 908, the time stamp counter can be modified based on the determined drift. For example, each core can use its own determined Mx+B to modify TSC so that adjusted TSC=M/N*Art Copy value. Mx+B can be a per core parameter which allows TSC to be used per virtual execution environments. For example, different virtual execution environments that run on the same core can have their own derived timer value adjustment based on a master timer.

Figure 10:
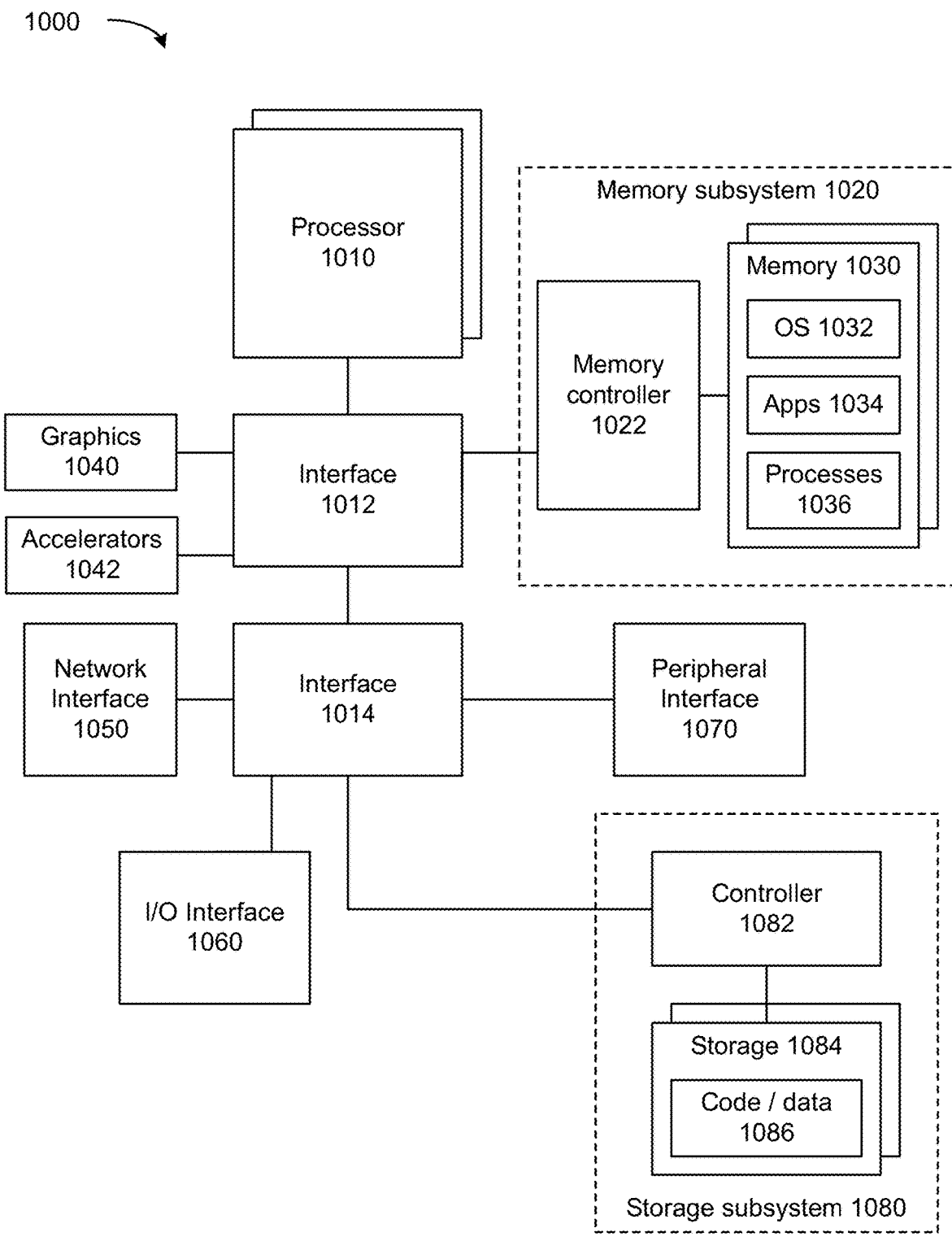
FIG. 10 depicts a system.

FIG. 10 depicts a system. The system can use embodiments described herein to synchronize time stamps with a network-based timer. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 440 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1110 or both. In one example, graphics interface 1040 generates a display based on data stored in memory 1030 or based on operations executed by processor 1010 or both.

Accelerators 1042 can be a fixed function offload engine that can be accessed or used by a processor 1010. For example, an accelerator among accelerators 1042 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 1050 can receive data from a remote device, which can include storing received data into memory. Various embodiments can be used in connection with network interface 1050, processor 1010, and memory subsystem 1020.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1046 in a persistent state (i.e., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (i.e., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory can involve refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Figure 11:
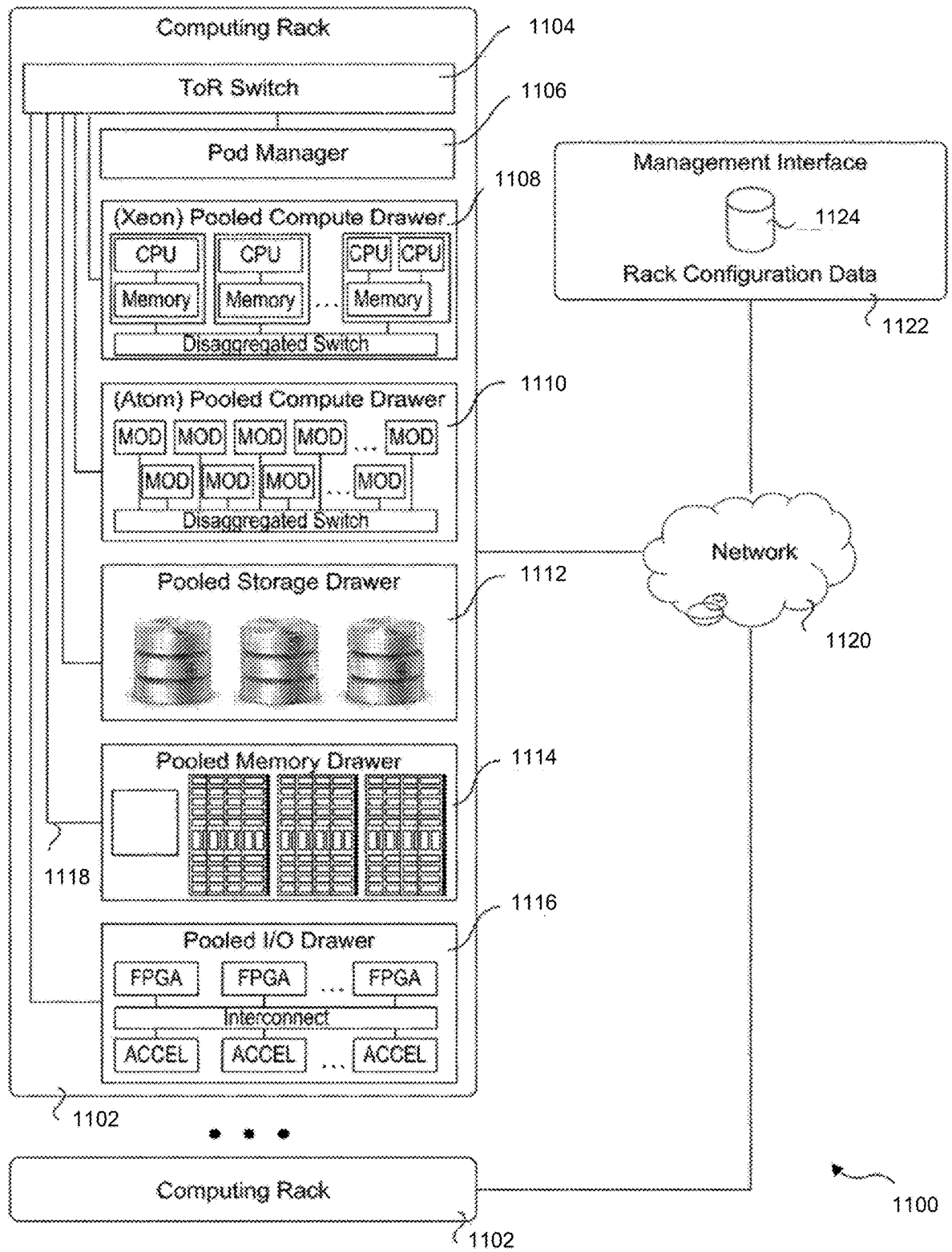
FIG. 11 depicts an example environment.

FIG. 11 depicts an environment 1100 includes multiple computing racks 1102, some including a Top of Rack (ToR) switch 1104, a pod manager 1106, and a plurality of pooled system drawers. Various embodiments can be used to synchronize timing among CPUs or devices in environment 1100. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1108, and Intel® ATOM™ pooled compute drawer 1110, a pooled storage drawer 1112, a pooled memory drawer 1114, and a pooled I/O drawer 1116. Some of the pooled system drawers is connected to ToR switch 1104 via a high-speed link 1118, such as a 40 Gigabit/second (Gb/s) or 100 Gb/s Ethernet link or a 100+Gb/s Silicon Photonics (SiPh) optical link. In one embodiment high-speed link 1118 comprises an 800 Gb/s SiPh optical link.

Multiple of the computing racks 1102 may be interconnected via their ToR switches 1104 (e.g., to a pod-level switch or data center switch), as illustrated by connections to a network 1120. In some embodiments, groups of computing racks 1102 are managed as separate pods via pod manager(s) 1106. In one embodiment, a single pod manager is used to manage racks in the pod. Alternatively, distributed pod managers may be used for pod management operations.

Environment 1100 further includes a management interface 1122 that is used to manage various aspects of the environment. This includes managing rack configuration, with corresponding parameters stored as rack configuration data 1124.

Figure 12:
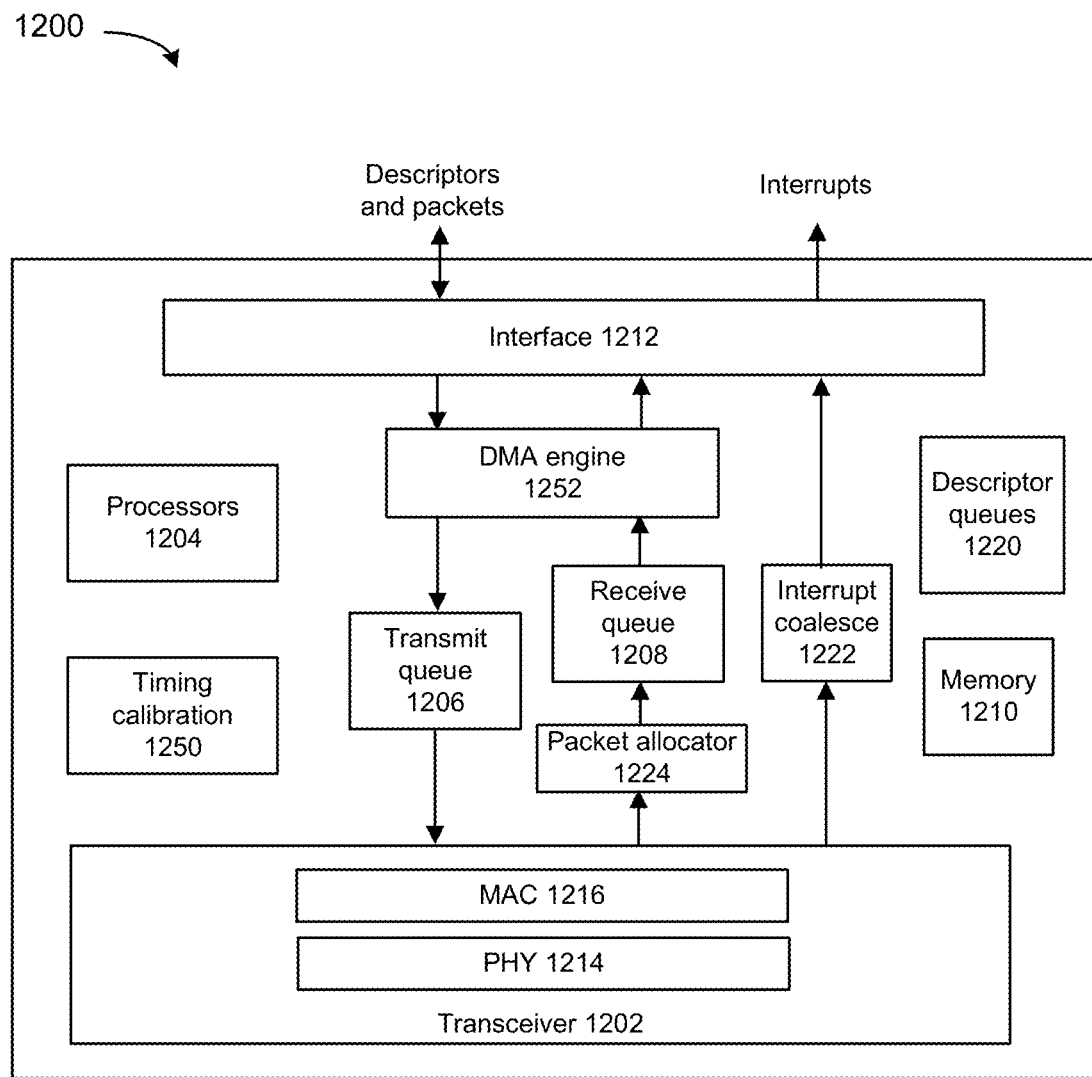
FIG. 12 depicts a network interface.

FIG. 12 depicts a network interface. The network interface can include timing calibration circuitry 1250 to generate a timer value based on a network signal, store network-based timer values for a received timer value from a CPU node, and provide the pair of network-based timer values for a received timer value from a CPU node to a CPU node so that the CPU node can determine a timer value based on a master timer. Network interface 1200 can include transceiver 1202, processors 1204, transmit queue 1206, receive queue 1208, memory 1210, and bus interface 1212, and DMA engine 1252. Transceiver 1202 can be capable of receiving and transmitting packets in conformance with the applicable protocols such as Ethernet as described in IEEE 802.3, although other protocols may be used. Transceiver 1202 can receive and transmit packets from and to a network via a network medium (not depicted). Transceiver 1202 can include PHY circuitry 1214 and media access control (MAC) circuitry 1216. PHY circuitry 1214 can include encoding and decoding circuitry (not shown) to encode and decode data packets according to applicable physical layer specifications or standards. MAC circuitry 1216 can be configured to assemble data to be transmitted into packets, that include destination and source addresses along with network control information and error detection hash values. Processors 1204 can be any a combination of a: processor, core, graphics processing unit (GPU), field programmable gate array (FPGA), application specific integrated circuit (ASIC), or other programmable hardware device that allow programming of network interface 1200. For example, a "smart network interface" can provide packet processing capabilities in the network interface using processors 1204.

Packet allocator 1224 can provide distribution of received packets for processing by multiple CPUs or cores using timeslot allocation described herein or RSS. When packet allocator 1224 uses RSS, packet allocator 1224 can calculate a hash or make another determination based on contents of a received packet to determine which CPU or core is to process a packet.

Interrupt coalesce 1222 can perform interrupt moderation whereby network interface interrupt coalesce 1222 waits for multiple packets to arrive, or for a time-out to expire, before generating an interrupt to host system to process received packet(s). Receive Segment Coalescing (RSC) can be performed by network interface 1200 whereby portions of incoming packets are combined into segments of a packet. Network interface 1200 provides this coalesced packet to an application.

Direct memory access (DMA) engine 1252 can copy a packet header, packet payload, and/or descriptor directly from host memory to the network interface or vice versa, instead of copying the packet to an intermediate buffer at the host and then using another copy operation from the intermediate buffer to the destination buffer.

Memory 1210 can be any type of volatile or non-volatile memory device and can store any queue or instructions used to program network interface 1200. Transmit queue 1206 can include data or references to data for transmission by network interface. Receive queue 1208 can include data or references to data that was received by network interface from a network. Descriptor queues 1220 can include descriptors that reference data or packets in transmit queue 1206 or receive queue 1208. Bus interface 1212 can provide an interface with host device (not depicted). For example, bus interface 1212 can be compatible with PCI, PCI Express, PCI-x, Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a method comprising: determining a first offset of a time stamp counter (TSC) for a first central processing unit (CPU) node relative to a master timer, wherein the master timer is provided by a separate device; determining a second offset of a TSC for a second CPU node relative to the master timer; adjusting the TSC for a first CPU node based on the first offset; and adjusting the TSC for a second CPU node based on the second offset.

Example 2 includes any example, wherein the separate device comprises one or more of: a network interface controller, graphics processing unit card, or accelerator and the master timer is based on a network source.

Example 3 includes any example, wherein determining a first offset of a TSC for a first CPU node relative to a master timer comprises: providing a copy of the TSC to the separate device; determining a master time stamp when the copy of the TSC is received; providing the master time stamp and the copy of the TSC to the first CPU node; and the first CPU node determining the first offset based, at least, in part on the master time stamp and the copy of the TSC.

Example 4 includes any example, wherein determining a second offset of a TSC for the second CPU node relative to the master timer comprises: providing a copy of the TSC to the separate device; determining a master time stamp when the copy of the TSC is received; providing the master time stamp and the copy of the TSC to the second CPU node; and the second CPU node determining the first offset based, at least, in part on the master time stamp and the copy of the TSC.

Example 5 includes any example, wherein the first offset comprises a linear offset and the second offset comprises a linear offset.

Example 6 includes any example, wherein the first CPU node uses a first crystal oscillator to generate a TSC.

Example 7 includes any example, wherein the second CPU node uses a second crystal oscillator to generate a TSC.

Example 8 includes an apparatus comprising: a first central processing unit (CPU) node comprising a time stamp counter (TSC); a second CPU node comprising a second TSC; an interface to an accelerator device, wherein the interface is to transfer a master time stamp for a first value of the TSC to the first CPU node and the interface is to transfer a master time stamp for a second value of the TSC to the second CPU node.

Example 9 includes any example, wherein: the first CPU node is to provide the first value of the TSC to the accelerator device using the interface and the second CPU node is to provide the second value of the TSC to the accelerator device using the interface.

Example 10 includes any example, wherein: the first CPU node is to determine a first offset for its time stamp based, at least, in part on the master time stamp for the first value of the TSC and the second CPU node is to determine a second offset for its time stamp based, at least, in part on the master time stamp for the second value of the TSC.

Example 11 includes any example, wherein the first CPU node and the second CPU node are to execute virtualized execution environments with time stamps that are synchronized based on the first and second offsets.

Example 12 includes any example, wherein the accelerator device comprises one or more of: a network interface controller, graphics processing unit card, or accelerator and the accelerator comprises a master timer.

Example 13 includes any example, and includes a host computer, a compute sled, a rack, or a data center.

Example 14 includes any example, wherein the master time stamp is based on a network source.

Example 15 includes any example, wherein the master time stamp is based on one or more of: an Ethernet port time stamp based on IEEE 1588 or a global positioning system (GPS) signal.

Example 16 includes any example, wherein the accelerator device comprises a network interface that provides the master time stamp and the master time stamp is based on a network source.

Example 17 includes any example, wherein the first CPU node is to use a first crystal oscillator to generate a TSC.

Example 18 includes any example, wherein the second CPU node is to use a second crystal oscillator to generate a TSC.

Example 19 includes a network interface comprising: a timer source to provide a network-based timer value, wherein the timer source is based on signals received from a network; a precision time measurement (PTM) device to receive a timer value from a first central processing unit (CPU) node; and a second precision time measurement (PTM) device to receive a second timer value from a second central processing unit (CPU) node, wherein: the PTM is to store a network-based timer value from the timer source associated with receipt of the timer value from the first CPU and provide a pair of the network-based timer value from the timer source associated with the timer value from the first CPU to the first CPU and the second PTM is to store a network-based timer value from the timer source associated with receipt of the second timer value from the second CPU and provide a pair of the network-based timer value from the timer source associated with the timer value from the first CPU to the second CPU.

Example 20 includes any example, wherein the network-based timer value is based on one or more of: an Ethernet port time stamp based on IEEE 1588 or a global positioning system (GPS) signal.

What is claimed is:

1. A method comprising:
a first central processing unit (CPU) node providing first and second time stamp counter (TSC) values to a separate device, wherein providing the first TSC value to the separate device causes the separate device to provide a first TSC value-primary timer value pair to the first CPU node and providing the second TSC value to the separate device causes the separate device to provide a second TSC value-primary timer value pair to the first CPU node;
the first CPU node determining a first offset of the TSC for the first CPU node relative to the primary timer based on the first and second TSC value-primary timer value pairs received from the separate device;
a second CPU node providing first and second TSC values to the separate device, wherein providing the first TSC value to the separate device causes the separate device to provide a first TSC value-primary timer value pair to the second CPU node and providing the second TSC value to the separate device causes the separate device to provide a second TSC value-primary timer value pair to the second CPU node;
the second CPU node determining a second offset of the TSC for the second CPU node relative to the primary timer;
the first CPU node adjusting the TSC for the first CPU node based on the first offset; and
the second CPU node adjusting the TSC for the second CPU node based on the second offset.

2. The method of claim 1, wherein the separate device comprises one or more of: a network interface controller, graphics processing unit card, or accelerator and the primary timer is based on a network source.

3. The method of claim 1, wherein the separate device to provide a first TSC value-primary timer value pair to the first CPU node comprises:
determining a primary time stamp value when the first TSC value is received by the separate device.

4. The method of claim 1, wherein the separate device to provide a first TSC value-primary timer value pair to the second CPU node comprises:
determining a primary time stamp value when the first TSC value for the second CPU node is received by the separate device.

5. The method of claim 1, wherein the first offset comprises a linear offset and the second offset comprises a linear offset.

6. The method of claim 1, wherein the first CPU node utilizes a first crystal oscillator to generate the first and second TSC values for the first CPU node.

7. The method of claim 1, wherein the second CPU node utilizes a second crystal oscillator to generate the first and second TSC values for the second CPU node.

8. An apparatus comprising:
a first central processing unit (CPU) node comprising a first time stamp counter (TSC) source;
a second CPU node comprising a second TSC source;
an interface to an accelerator device, wherein
by a copy of a first value of the first TSC source to the interface, the first CPU node is to initiate and cause the interface to transfer a primary time stamp value recorded for the first value of the first TSC source from the accelerator device to the first CPU node,
by a copy of a second value of the first TSC source to the interface, the first CPU node is to initiate and cause the interface to transfer a second primary time stamp value recorded for the second value of the first TSC source from the accelerator device to the first CPU node,
by a copy of a first value of the second TSC source to the interface, the second CPU node is to initiate and cause the interface to transfer a primary time stamp value recorded for the first value of the second TSC source from the accelerator device to the second CPU node, and
by a copy of a second value of the second TSC source to the interface, the second CPU node is to initiate and cause the interface to transfer a second primary time stamp value recorded for the second value of the second TSC source from the accelerator device to the second CPU node.

9. The apparatus of claim 8, wherein:
the first CPU node is to provide the first value of the first TSC source to the accelerator device using the interface and
the second CPU node is to provide the first value of the second TSC source to the accelerator device using the interface.

10. The apparatus of claim 8, wherein:
the first CPU node is to determine a first offset for the first TSC source based, at least, in part on the primary time stamp values recorded for the first and second values of the first TSC source and
the second CPU node is to determine a second offset for the second TSC source based, at least, in part on the primary time stamp values recorded for the first and second values of the second TSC source.

11. The apparatus of claim 10, wherein the first CPU node and the second CPU node are to execute virtualized execution environments with time stamps that are synchronized based on the first and second offsets.

12. The apparatus of claim 8, wherein the accelerator device comprises one or more of: a network interface controller, graphics processing unit, or accelerator and the accelerator device comprises a primary timer device to generate primary time stamp values.

13. The apparatus of claim 8, comprising a computer, a compute sled, a rack, or a data center and wherein the computer, the compute sled, the rack, or the data center comprise the first CPU node and the second CPU node.

14. The apparatus of claim 8, wherein at least one primary time stamp value is based on a network source.

15. The apparatus of claim 8, wherein at least one of said primary time stamp values is based on one or more of: an Ethernet port time stamp based on IEEE 1588 or a global positioning system (GPS) signal.

16. The apparatus of claim 8, wherein the accelerator device comprises a network interface that is to provide at least one of said primary time stamp values based on a network source.

17. The apparatus of claim 8, wherein the first CPU node is to use a first crystal oscillator to generate the first value of the first TSC source.

18. The apparatus of claim 8, wherein the second CPU node is to use a second crystal oscillator to generate the first value of the second TSC source.

19. A network interface comprising:
a network interface device comprising:

a timer source to provide a network-based timer value, wherein the timer source is based on signals received from a network;
a precision time measurement (PTM) device to receive at least two timer values from a first central processing unit (CPU) node; and
a second PTM device to receive a timer value from a second CPU node, wherein:
receipt of a first timer value of the at least two timer values from the first CPU node is to cause: the PTM device to store a first network-based timer value from the timer source associated with receipt of the first timer value of the at least two timer values from the first CPU node from the first CPU node and provide a pair of the first network-based timer value from the timer source associated with the first timer value of the at least two timer values from the first CPU node to the first CPU node,
receipt of a second timer value of the at least two timer values from the first CPU node is to cause: the PTM device to store a second network-based timer value from the timer source associated with receipt of the second timer value of the at least two timer values from the first CPU node from the first CPU node and provide a pair of the second network-based timer value from the timer source associated with the second timer value of the at least two timer values from the first CPU node to the first CPU node, and
receipt of the timer value from the second CPU node is to cause: the second PTM device to store a network-based timer value from the timer source associated with receipt of the timer value from the second CPU node and provide a pair of the network-based timer value from the timer source associated with the timer value from the second CPU node to the second CPU node.

20. The network interface of claim 19, wherein the first network-based timer value is based on one or more of: an Ethernet port time stamp based on IEEE 1588 or a global positioning system (GPS) signal.

21. The method of claim 1, wherein the first CPU node adjusting the TSC for the first CPU node based on the first offset comprises:
determining a linear relationship comprising mX+b, where X comprises a primary timer value, m comprises a slope based on the first and second TSC value-primary timer value pairs, and b comprises a linear offset based on the first and second TSC value-primary timer value pairs and
adjusting a TSC value for the first CPU node based on the determined linear relationship.

22. The method of claim 1, comprising:
a Peripheral Component Interconnect express (PCIe) consistent interface circuitry in the separate device:
receiving the first and second TSC values from the first CPU node and a primary timer value corresponding to the first and second TSC values from the first CPU node and
providing the first and second TSC value-primary timer value pairs to the first CPU node.

23. An apparatus comprising:
a network interface device comprising:
a first interface to a first central processing unit (CPU);
a second interface to a second CPU; and
circuitry to receive a time stamp from the first CPU by the first interface and to receive a time stamp from the second CPU by the second interface, wherein:
receipt of the time stamp from the first CPU by the first interface is to cause the circuitry to provide, to the first CPU, a time stamp value based on a clock signal from a clock source corresponding to the received time stamp from the first CPU,
receipt of the time stamp from the second CPU by the second interface is to cause the circuitry to provide, to the second CPU, a time stamp value based on the clock signal from the clock source corresponding to the received time stamp from the second CPU, and
the first CPU is to adjust a time stamp counter value based, at least in part, on the time stamp value based on the clock signal corresponding to the received time stamp from the first CPU.

24. The apparatus of claim 23, wherein
the second CPU is to adjust a time stamp counter value based, at least in part, on the time stamp value based on the clock signal corresponding to the received time stamp from the second CPU.

25. The apparatus of claim 23, wherein
the first interface is to operate consistent with Peripheral Component Interconnect express (PCIe) and
the second interface is to operate consistent with PCIe.

* * * * *